June 10, 1930.    J. MIHALYI    1,762,933
PROJECTION SYSTEM FOR COLOR PICTURES
Filed May 11, 1927
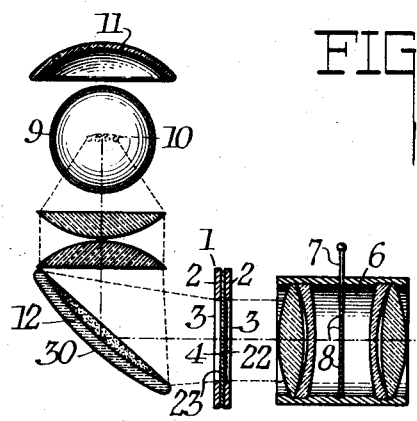
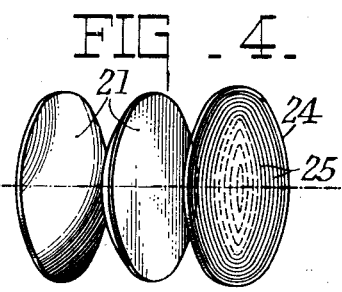
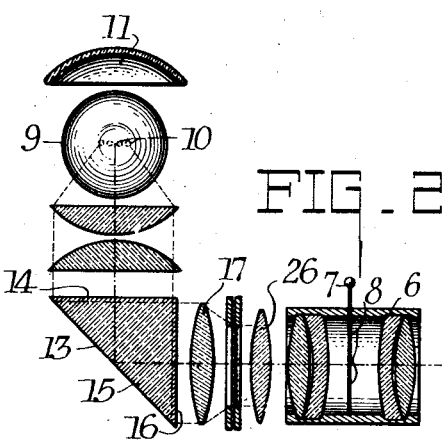
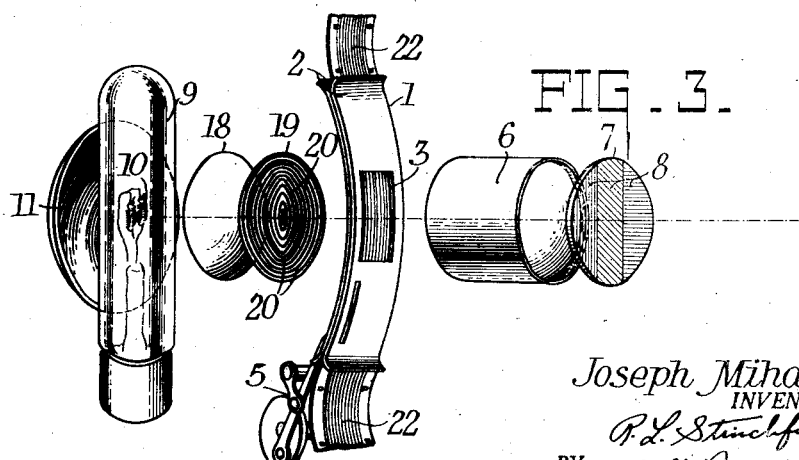
Joseph Mihalyi, INVENTOR,
BY
ATTORNEYS.

Patented June 10, 1930

1,762,933

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

PROJECTION SYSTEM FOR COLOR PICTURES

Application filed May 11, 1927. Serial No. 190,510.

This application relates to a projector for color motion pictures and particularly to a projection system for use in connection with the process disclosed in the United States patent to Berthon 992,151, granted May 16, 1911.

This process involves the placing of a multicolor filter at the objective and the use of an element having lenticular protuberances on the surface facing the objective and carrying a photographic layer on the other surface.

The most available lamps for use in small portable projectors adapted to project pictures according to this process have long filaments. They are usually marketed in a definite form or design as in a series of parallel coils, which appear in use as parallel light bands.

In carrying out the process the images of these light bands are projected through the gate and the film thereat and focused at or near the filter. Unless the lamps are accurately adjusted and sometimes even then, the images are of non-uniform brilliance and the color sections of the filter are not uniformly illuminated, resulting in incorrect color balance in the projected picture.

This fault may be largely overcome by including in the projection system an element that will introduce a limited amount of diffusion as will be better understood from the following description wherein reference to the accompanying drawings, in all the figures of which the same reference characters denote the same parts and in which:

Fig. 1 is a diagrammatic plan of a projection system embodying my invention;

Fig. 2 is a similar plan of a modified system;

Fig. 3 is a diagrammatic perspective view of a still different embodiment of my invention;

Fig. 4 is a similar view of a fourth modification.

It is to be understood that the mechanical details are largely omitted from the drawings, these constituting no part of my present invention and being unnecessary to an understanding thereof.

The usual projection gate 1 is provided, consisting of front and back plates 2 with registering windows 3, between which the film 4 is drawn by a pulldown mechanism, shown conventionally at 5 in Fig. 3 only. In front of the gate and in optical alignment therewith is a projection objective 6, associated with which is a filter 7 consisting of color sections here shown as vertical color bands 8.

Behind the gate is a lamp 9, having the band filaments 10, and behind this is a mirror 11. Between the lamp and gate is a condenser system, various forms of which are shown in the several figures but each including an element for somewhat diffusing the light.

The film 4 has formed in the front surface protuberances as described in the said Berthon patent, here shown as convex ridges 22 longitudinal of the film; and on the other surface has a layer 23 carrying photographic images corresponding to such lenticular ridges.

The condenser system shown in Fig. 1 comprises a pair of plano-convex lenses and a mirror 12, here shown as spherically concave. The mirror has the usual metallic coating 30 on its rear surface and its front surface is rendered slightly diffusing. This may be done by a very light sand blasting or by submission for a short time (say two minutes) to dilute hydrofluoric acid (say one part of acid to one part of water) or by spraying, as with an air brush, with water glass (sodium silicate). This last method is the cheapest and quickest, and permits removal of the coating if the diffusion is too great. In general the diffusion should be only enough to leave the specularly reflected image somewhat blurrred but plainly visible. I have found that this slight amount of diffusion is sufficient to offset the lack of uniformity of the image at the filter due to inaccurate positioning of the lamp house.

In a correctly focused system, the condenser system projects the bands of the light source, and the images of such bands reflected back between the bands by the mirror 11 through the gate to a plane at or near the filter, giving satisfactorily uniform illumination at both the gate and the filter.

The system shown in Fig. 2 is similar to that of Fig. 1 except that a reflecting prism 13 and separate lens 17 are used instead of a mirror. Any one or more of the three surfaces of the prism, namely, the plane entrance surface 14, the reflecting surface 15 or the emergent surface 16 or a surface of lens 17 may be rendered diffusing to the extent sufficient to produce the result as described.

Still another, and in some respects a preferable, way by which the desired amount of diffusion is introduced is by the use of polished grooves as described in the patents of Frederick and Hopkins, 1,370,885, granted March 8, 1921 and Frederick 1,627,892, granted May 10, 1927. As there described a controlled amount of diffusion may be given an image without general scatter, or diffusion or loss of light as by the methods above mentioned. This may be utilized either on a surface of a lens or by means of a plate specially introduced for the purpose. The first of these expedients is illustrated in Fig. 3, wherein the condensing system consists of two positive lens elements 18 and 19, the latter having on one of its surfaces grooves 20 such as are described in said patents.

In Fig. 4, the condensing system consists of two ordinary plano-convex elements 21 and a disc 24 having grooves 25 such as described in the said patents.

If necessary a collimating lens 26 may be used, as shown in Fig. 2, in front of the gate, the purpose of this being to compensate for any difference between the focal lengths of the projection objective and the objective by which the pictures were taken. The filter 7 may be between the components of the objective 6 as in Figs. 1 and 2 or in front of the objective 6 as in Figs. 3 and 4, depending on the optical requirements of the particular system.

In any event, there is introduced into the system, which would otherwise project at or near the filter 7, a reasonably sharp image of the filaments 10 and their reflected images, an amount of diffusion sufficient to blur a sharp image uniformly but leaving it still visible as an image. Of course, the images, being a series of light bands substantially filling the field, are not usually visible except as a uniform illumination, but maladjustment renders them visible as bands giving non-uniform illumination to the color fields, and the evil effects of this are overcome by the amount of diffusion described.

The cross section of the film and the size of the protuberances thereon are on an exaggerated scale.

In every case the affected surface is modified symmetrically of the optical axis so that the effect is uniform throughout the beam and the beam as it passes the projection gate illuminates it, and the film thereat, uniformly over its area. By "uniformly" I mean with sufficient uniformity of light intensity to give a satisfactory picture on projection without noticeable variation.

The above described forms are by way of example and I contemplate as included within my invention all such modifications and equivalents as fall within the scope of the appended claims.

Having thus described my invention, what I claim as new and desire to secure by Letters Patent is:

1. In a projector, a projection gate, a projection objective in front of said gate, a filter comprising color sections also in front of the gate and associated with said objective, a light source behind the gate, and a condenser system between the light source and the gate and projecting an image of the light source through the gate and upon the filter, said system including a surface modified to diffuse light projected therethrough, the extent of diffusion being such that an otherwise sharp image is rendered blurred but still visible as an image.

2. In a projector, a projection gate, a projection objective in front of said gate, a filter comprising color sections also in front of the gate and associated with said objective, a light source behind the gate, and a condenser system between the light source and the gate and projecting an image of the light source through the gate upon the filter, said system including a surface modified symmetrically throughout its area to introduce a predetermined amount of diffusion into a beam projected therethrough, the extent of diffusion being such that an otherwise sharp image is rendered blurred but still visible as an image, and the beam as it passes the gate illuminating the area thereof uniformly.

3. In a projector, a projection gate, a projection objective in front of said gate, a filter comprising vertical color bands also in front of the gate and associated with said objective, a vertically banded light source behind the gate, and a condenser system between the light source and the gate, and projecting an image of the light source through the gate upon the filter, said system including a surface modified symmetrically throughout its area to introduce a predetermined amount of diffusion into a beam projected therethrough, the extent of diffusion being such that an otherwise sharp image is rendered blurred but still visible as an image, and the beam as it passes the gate illuminating the area thereof uniformly.

4. In a projector, a projection gate, a projection objective in front of said gate, a filter comprising vertical color bands associated with said objective, a vertically banded light source behind the gate, and a condenser system between the light source and the gate and projecting an image of the light source through the gate upon the filter, said system including a reflecting element having a surface modified symmetrically throughout its area to introduce a predetermined amount of diffusion into a beam projected therethrough, the extent of diffusion being such that an otherwise sharp image is rendered blurred but still visible as an image, and the beam as it passes the gate illuminating the area thereof uniformly.

5. In combination, a projection gate, a transparent element at said gate having on its front surface a series of minute parallel, vertical ridges and on its rear surface photographic images corresponding to said ridges, a projection objective in front of and in optical alignment with said gate, a filter associated with said objective and comprising vertical color bands, a vertically banded light source behind and at one side of said gate, and a condensing system between said source and said gate and including a reflecting element having a surface modified symmetrically throughout its area to introduce a predetermined amount of diffusion into a beam projected therethrough, the extent of diffusion being such that an otherwise sharp image is rendered blurred but still visible as an image and the beam as it passes the gate illuminating the area thereof uniformly.

Signed at Rochester, New York, this 6th day of May, 1927.

JOSEPH MIHALYI.